(12) United States Patent
Khurana et al.

(10) Patent No.: US 11,176,552 B2
(45) Date of Patent: Nov. 16, 2021

(54) SYSTEMS AND METHODS FOR AUTOMATED CUSTOMER RECURRING PAYMENT PROCESSING

(71) Applicant: Walmart Apollo, LLC, Bentonville, AR (US)

(72) Inventors: Karan Khurana, Foster City, CA (US); Chandrasekar Ramalingam, Belmont, CA (US); Vasu Palanisamy, San Ramon, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 361 days.

(21) Appl. No.: 15/983,630

(22) Filed: May 18, 2018

(65) Prior Publication Data

US 2018/0336557 A1    Nov. 22, 2018

Related U.S. Application Data

(60) Provisional application No. 62/508,289, filed on May 18, 2017.

(51) Int. Cl.
*G06Q 20/22* (2012.01)
*G06Q 20/40* (2012.01)
*G06Q 20/10* (2012.01)

(52) U.S. Cl.
CPC ......... *G06Q 20/401* (2013.01); *G06Q 20/102* (2013.01); *G06Q 20/108* (2013.01); *G06Q 20/22* (2013.01); *G06Q 20/405* (2013.01)

(58) Field of Classification Search
CPC .. G06Q 20/401; G06Q 20/102; G06Q 20/108; G06Q 20/22; G06Q 20/405
See application file for complete search history.

(56) References Cited

U.S. PATENT DOCUMENTS

| | | | |
|---|---|---|---|
| 7,356,304 B2 | 4/2008 | Zoeckler |
| 7,890,375 B2 | 2/2011 | Schwankl |
| 7,959,074 B1 | 6/2011 | Chopra |
| 8,401,904 B1 | 3/2013 | Simakov |
| 8,669,875 B1 | 3/2014 | Tresenfeld |

(Continued)

OTHER PUBLICATIONS

PCT; App No. PCT/US2019/025954, International Search Report and Written Opinion dated Jun. 28, 2019; pp. 1-14.

(Continued)

*Primary Examiner* — Scott C Anderson
*Assistant Examiner* — Matthew Cobb
(74) *Attorney, Agent, or Firm* — Fitch, Even, Tabin & Flannery LLP

(57) ABSTRACT

Systems, apparatuses, and methods are provided herein for automated customer recurring payment processing. A central computer system being configured to detect a payment date for a recurring payment associated with a customer account, retrieve customer payment information, and submit the customer payment information to a bank system. In the event the authorization fails and an error code corresponds to a payment information error, the system automatically generates a notification message to the customer at the messaging server, submits the updated customer payment information to the bank system, and updates an account status of the customer account when a payment authorization is received from the bank system.

15 Claims, 12 Drawing Sheets

(56) References Cited

U.S. PATENT DOCUMENTS

| | | |
|---|---|---|
| 8,744,962 B1 | 6/2014 | Dennes |
| 8,935,182 B2 | 1/2015 | Cockrill |
| 9,760,871 B1* | 9/2017 | Pourfallah ......... G06Q 20/3276 |
| 2002/0143655 A1 | 10/2002 | Elston |
| 2003/0191711 A1 | 10/2003 | Jamison |
| 2008/0243644 A1 | 10/2008 | Bezos |
| 2009/0259565 A1 | 10/2009 | Avisror |
| 2010/0145861 A1 | 6/2010 | Law |
| 2011/0055061 A1 | 3/2011 | Yee |
| 2011/0320320 A1 | 12/2011 | Dearlove |
| 2012/0265683 A1* | 10/2012 | da Silva ............... G06Q 20/407 705/44 |
| 2013/0117185 A1 | 5/2013 | Collison |
| 2013/0151380 A1 | 6/2013 | Holt |
| 2013/0232078 A1* | 9/2013 | Lynam .................. G06Q 20/40 705/44 |
| 2013/0311369 A1 | 11/2013 | Elrod |
| 2015/0046271 A1 | 2/2015 | Scholl |
| 2016/0125409 A1* | 5/2016 | Meredith ............... G06Q 40/02 705/44 |
| 2016/0364724 A1* | 12/2016 | Wang ................... G06Q 20/102 |
| 2016/0371133 A1 | 12/2016 | Jhunjhunwala |
| 2017/0063948 A1 | 3/2017 | Shroff |
| 2017/0278079 A1 | 9/2017 | Winking |
| 2018/0336557 A1 | 11/2018 | Khurana |

OTHER PUBLICATIONS

USPTO; U.S. Appl. No. 16/373,411; Office Action dated Jul. 9, 2020, (pp. 1-15).

* cited by examiner

Partial View of FIG. 5A

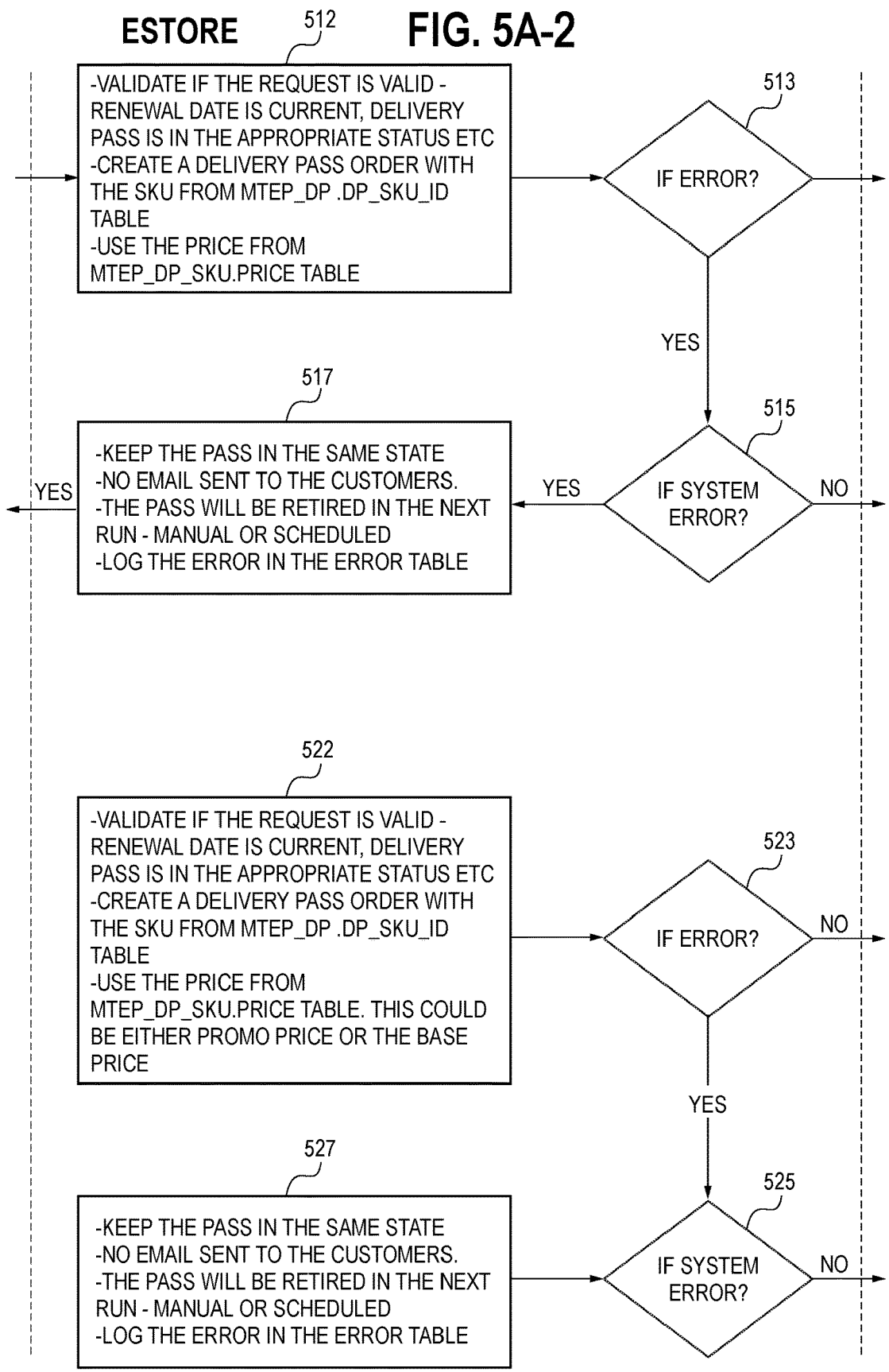
Partial View of FIG. 5A

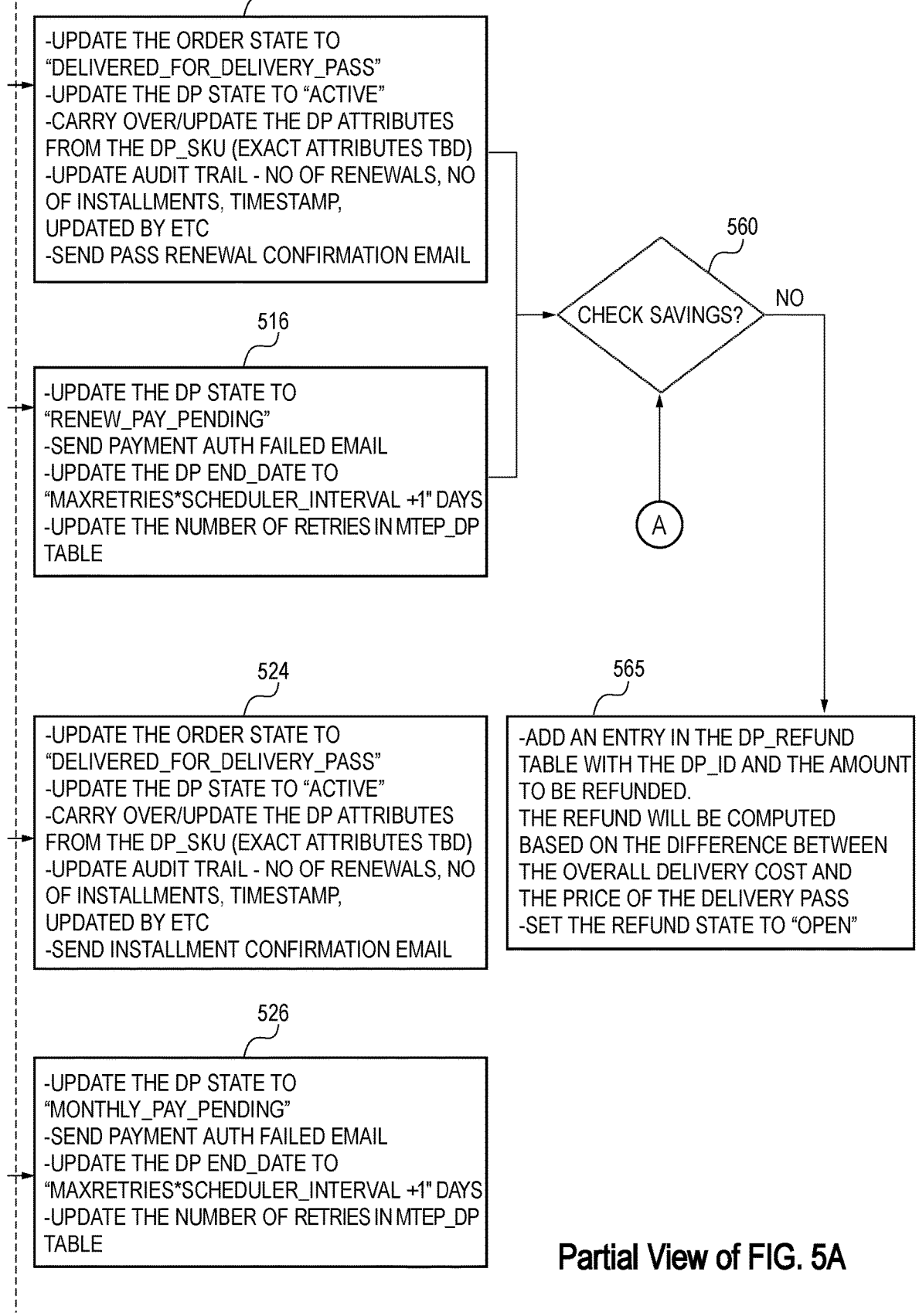

Partial View of FIG. 5B

Partial View of FIG. 5B

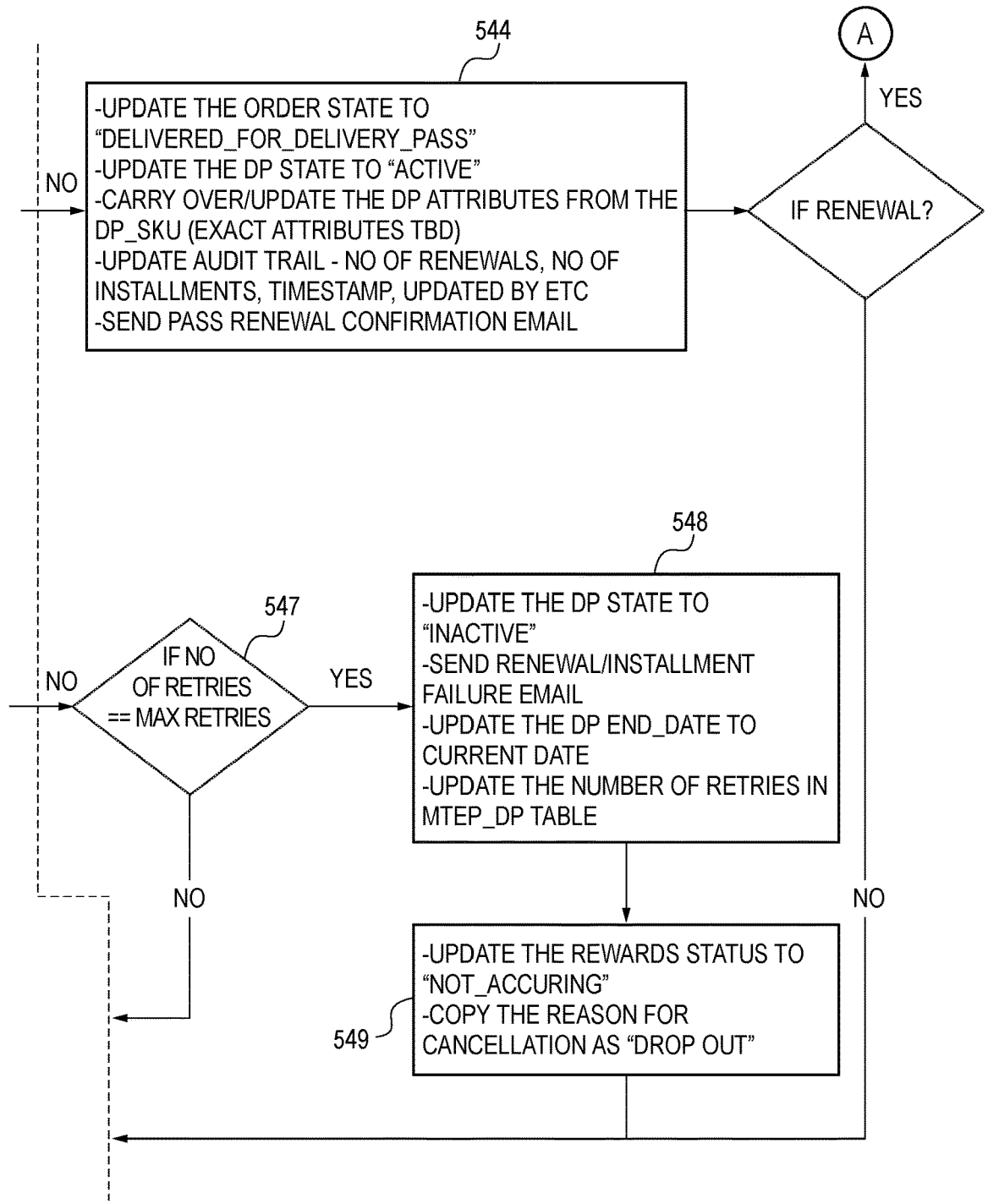

SYSTEMS AND METHODS FOR AUTOMATED CUSTOMER RECURRING PAYMENT PROCESSING

CROSS-REFERENCE TO RELATED APPLICATION

This application claims the benefit of U.S. Provisional Application No. 62/508,289 filed May 18, 2017, which is incorporated herein by reference in its entirety.

TECHNICAL FIELD

These teachings relate generally to payment processing systems.

BACKGROUND

Recurring payments, also referred to as AutoPay, are automatic payments where customers authorize a merchant to make charges to their credit card or bank account periodically (e.g. monthly). A customer's payment information are generally provided by the customer when the customer signs up for the recurring payment program.

BRIEF DESCRIPTION OF THE DRAWINGS

Disclosed herein are embodiments of systems and methods for recurring payment processing. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for processing returns. In some embodiments, a system for automated customer recurring payment processing comprises a recurring payment database storing payment information for a plurality of customers, a payment system coupled to one or more bank systems, a messaging server configured to generate and send messages to customers, and a central computer system coupled to the recurring payment database, the payment system, and the messaging server. The central computer system being configured to: detect a payment date for a recurring payment associated with a customer account, retrieve customer payment information for the customer account from the recurring payment database, the customer payment information comprises information provided by a customer to set up the recurring payment, submit the customer payment information to a bank system for authorization via the payment system, in the event the authorization fails and an error code determined based on a communication between the payment system and the bank system corresponds to a payment information error: automatically generate a notification message to the customer at the messaging server, receive updated customer payment information in response to the notification message, submit the updated customer payment information to the bank system via the payment system; and update an account status of the customer account when a payment authorization is received from the bank system.

Figure 1:
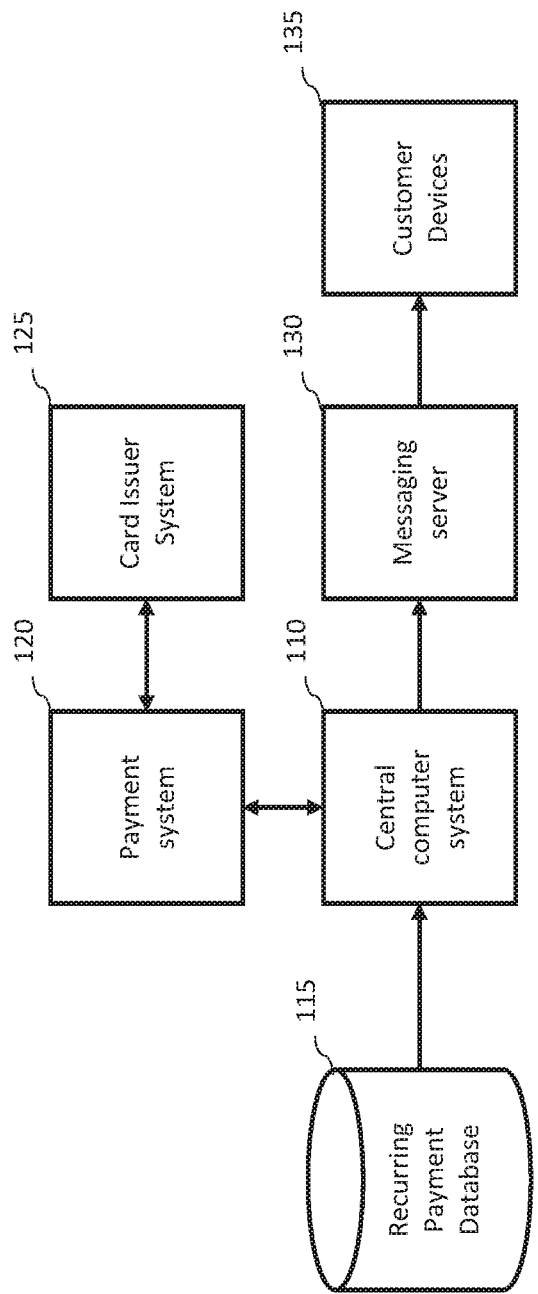
FIG. 1 comprises a system diagram as configured in accordance with various embodiments of these teachings.

Referring next to FIG. 1, a block diagram of a system according to some embodiments is shown. The system comprises a central computer system 110, a recurring payment database 115, a payment system 120, bank systems 125, a messaging server 130, and customer devices 135.

The central computer system 110 may comprise a processor-based system such as one or more of an enterprise computer system, a server system, a networked computer system, a cloud-based server, and the like. The central computer system 110 comprises a control circuit and a memory. The control circuit may comprise a processor, a central processor unit, a microprocessor, and the like. The memory may include one or more of a volatile and/or non-volatile computer readable memory devices. In some embodiments, the memory stores computer executable codes that cause the control circuit to process recurring payments and provide customer notifications when a recurring payment fails to authorize. In some embodiments, the control circuit of the central computer system 110 may further be configured to receive payment information from customer devices 135, store the payment information in the recurring payment database 115, and process payments on payment dates via the payment system 120. If the payment authorization fails, the central computer system 110 may determine whether the error is associated with the customer payment information or some other system issue. If the error is associated with customer payment information, the central computer system 110 may cause the messaging server 130 to generate a message to send to the customer device 135. In some embodiments, the computer executable code stored in the memory may cause the control circuit of the central computer system 110 to perform one or more steps described with reference to FIGS. 3-5B herein.

The recurring payment database 115 may be configured to store payment information for a plurality of customers. In some embodiments, the recurring payment database 115 may comprise one or more computer readable mass memory storage devices. In some embodiments, payment information may comprise one or more of customer name, address, account number, credit card number, debit card number, expiration date, security code, phone number, and passcode. In some embodiments, payment information may comprise information provided by a customer to set up the recurring payment and/or information needed to request payment authorization from a bank system 125. In some embodiments, the recurring payment database 115 may further store other customer account information such as payment date, account type, account terms, authorized payment amounts, customer contact information, customer payment history, etc. In some embodiments, a customer account may comprise a subscription, and the recurring payment comprises a subscription fee for one or more of a club membership, a delivery service, a media subscription, a service subscription, and a product subscription. In some embodiments, recurring payment may comprise one or more of an installment payment, a loan payment, and a bill payment.

The payment system 120 may comprise an enterprise computer system, a server system, a networked computer system, a cloud-based server, and the like. The payment system 120 comprises a control circuit and a memory. The control circuit may comprise a processor, a central processor unit, a microprocessor, and the like. The memory may include one or more of a volatile and/or non-volatile computer readable memory devices. In some embodiments, the memory stores computer executable codes that cause the control circuit to interface with the bank systems 125 to obtain payment authorization. In some embodiments, the payment system 120 may submit payment information to the bank system 125 and determine a reason/error code based on the communication with the bank system 125. Examples of reason/error codes that may be determined by the payment system 125 are provided in Table 1 herein. In some embodiments, the payment system 120 may be configured to aggregate payment authorization requests and submit them in batches to one or more bank systems 125. In some embodiments, the payment system 120 and the bank systems 125 may communicate over a network such as one or more of a secured network, the Internet, a public network, a private network, and the like. The bank systems 125 may comprise authorizer and/or issuer systems of credit cards and debit cards.

The messaging server 130 may comprise an enterprise computer system, a server system, a networked computer system, a cloud-based server, and the like. The messaging server 130 comprises a control circuit and a memory. The control circuit may comprise a processor, a central processor unit, a microprocessor, and the like. The memory may include one or more of a volatile and/or non-volatile computer readable memory devices. In some embodiments, the memory stores computer executable codes that cause the control circuit to generate notification messages for customer devices 135. In some embodiments, the messaging server 130 may receive a list of customers to notify from the central computer system 110 and the messaging server 130 may fill out message templates with customer's account information from the recurring payment database 115 and send the message to the customer based on the customer's contact information. In some embodiments, the notification message may comprise a link to a website and/or a phone number to a customer service center for the customer to provide the updated customer payment information. In some embodiments, notification messages may comprise an email, a text message, a voice message (e.g. "robocall), a mobile messaging application message (e.g. Google chat, Facebook messenger, etc.), and the like. In some embodiments, the customer account and/or subscription may be associated with a mobile application (e.g. mobile ordering application, media play application, etc.) and the notification message may comprise a pop-up notification and/or in-app notification. In some embodiments, the messaging server 130 and the customer devices 135 may communicate over a network such as one or more of a secured network, the Internet, a public network, a private network, a cellular network, a mobile data network, and the like. The customer devices 135 may comprise user interface devices with user input/output devices. In some embodiments, customer devices 135 may comprise one or more of a mobile phone, a smart phone, a personal computer, a tablet computer, a wearable device, a home assistant device, a voice controlled device, and the like. In some embodiments, the customer device 135 may provide a recurring payment user interface for the customers to enter payment information, configure their accounts, and/or view messages from the messaging server 130. In some embodiments, the recurring payment user interface may comprise one or more of a mobile application, a website, a cloud-based user portal, a desktop application, and the like.

In some embodiments, one or more of the central computer system 110, the recurring payment database 115, the payment system 120 and the messaging server 130 may comprise one or more individually implemented and/or shared hardware systems. In some embodiments, the payment system 120 and/or the messaging server 130 may be implemented as software module(s) on the central computer system 110 or implemented as separate physical systems. In some embodiments, one or more of the central computer system 110, the payment system 120 and the messaging server 130 may individually and/or collectively perform one or more steps described with reference to FIGS. 3-5B herein.

Figure 2:
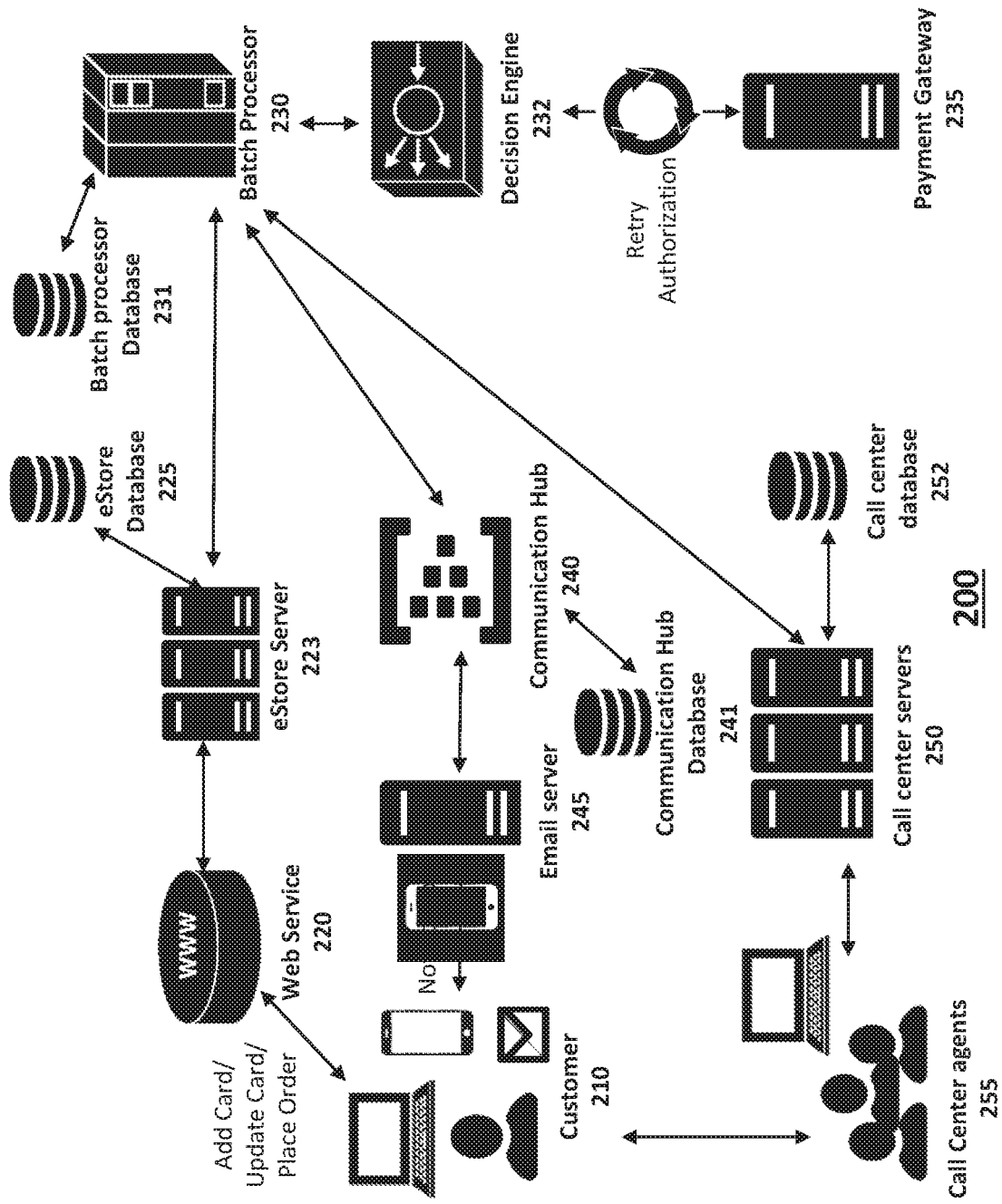
FIG. 2 comprises a system diagram as configured in accordance with various embodiments of these teachings.

Referring next to FIG. 2, an illustration of a system according to some embodiments is shown. In the system 200, a customer 210 may use a web service 220 provided by an eStore server 223 to add card information, updated card information, and/or place one-time or recurring orders for products or services. In some embodiments, the web service 220 may comprise a website, a mobile application, a desktop application, and the like configured to provide a graphical user interface (GUI) to customers of the eStore. In some embodiments, the eStore database 225 may store customer profiles, payment information, orders, and subscription received via the web service 220. In some embodiments, eStore database 225 may further store information associated with products and services offered through the eStore server and/or terms and conditions for recurring payments (e.g. subscriptions) and the eStore server 223 may use the information stored in the eStore database 225 to determine the information to display in the web service 220 user interface.

The batch processor 230 may generally be configured to batch payments for the eStore server 223. In some embodiments, the batch processor 230 may aggregate a set of payment requests (e.g. for each day, for each 6 hours, etc.) to process. The batch payment requests are then forward to bank systems via the payment gateway 235. If a request is authorized, the batch processor 230 communicates the authorization to the eStore server 223 and the customer's account is updated. If a payment request fails, the decision engine 232 is configured to determine how to handle the rejected payment authorization request. In some embodiments, if the authorization failure is associated with a system error, the decision engine 232 attempts periodical resubmission of the authorization request without notifying the customers 210 or the call centers. If the authorization failure is associated with payment information (e.g. card expired, billing address does not match, insufficient fund, etc.) the decision engine 232 may send the failed customer accounts and/or payment information to the communication hub 240 and/or the call center servers 250. In some embodiments, customer authorization success information may be stored in the batch processor database 231 and used by the batch processor 230 and/or the decision engine 232 to determine whether and when to resubmit customer payment information and/or send notifications to customers.

The communication hub 240 may be configured to generate notification messages for customers based on payment information errors reported by the batch processor 230. In some embodiments, the communication hub 240 may use the communication hub database 241 to generate the messages. The communication hub database 241 may store email templates and customer contact information. The generated messages are then sent to customers 210 via an email server and over a network. In some embodiments, the notification message may comprise a link to a website and/or a phone number to a customer service center for the customer to provide the updated customer payment information. When a customer 210 receives a notification message, a customer may access the web service 220 to provide updated payment information and/or contact a call center agent 255 for assistance.

In some embodiments, the batch processor 230 may further report payment information errors to call center servers 250. Customer order, account, and payment information may be stored in the call center database 252 to be accessed by call center agents 255 to assist customers with updating their payment information. For example, while on a call with a customer, a call center agent may access a user interface provided by the call center servers 250 to review customer account and payment information.

In some embodiments, one or more components of the system 200 shown in FIG. 2 may be communicatively coupled to each other via a data network such as one or more of a secured network, the Internet, a public network, a private network, and the like. In some embodiments, one or more of the web service 220, the eStore server 223, the batch processor 230, the decision engine 232, the payment gateway 235, the communication hub 240, the email server 245, and the call center servers 250 may comprise one or more individually implemented and/or shared hardware systems. In some embodiments, one or more of the web service 220, the eStore server 223, the batch processor 230, the decision engine 232, the payment gateway 235, the communication hub 240, the email server 245, and the call center servers 250 may be implemented as software module another system or be implemented as a physically separated system. In some embodiments, one or more of the web service 220, the eStore server 223, the batch processor 230, the decision engine 232, the payment gateway 235, the communication hub 240, the email server 245, and the call center servers 250 may individually and/or collectively perform one or more steps described with reference to FIGS. 3-5B herein.

In some embodiments, the eStore database 225, the batch processor database 231, the communication hub database 241, and the call center database 252 may comprise computer readable mass storage devices. In some embodiments, one or more of the eStore database 225, the batch processor database 231, the communication hub database 241, and the call center database 252 may be implemented on one or more shared or individual physical devices. In some embodiments, one or more of the eStore database 225, the batch processor database 231, the communication hub database 241, and call center database 252 may be implemented on one or more memory devices of another component of the system 200. In some embodiments, the eStore database 225, the batch processor database 231, the communication hub database 241, and the call center database 252 may comprise one or more server-based and/or cloud-based storage databases accessible by one or more other components of the system 200.

Figure 3:
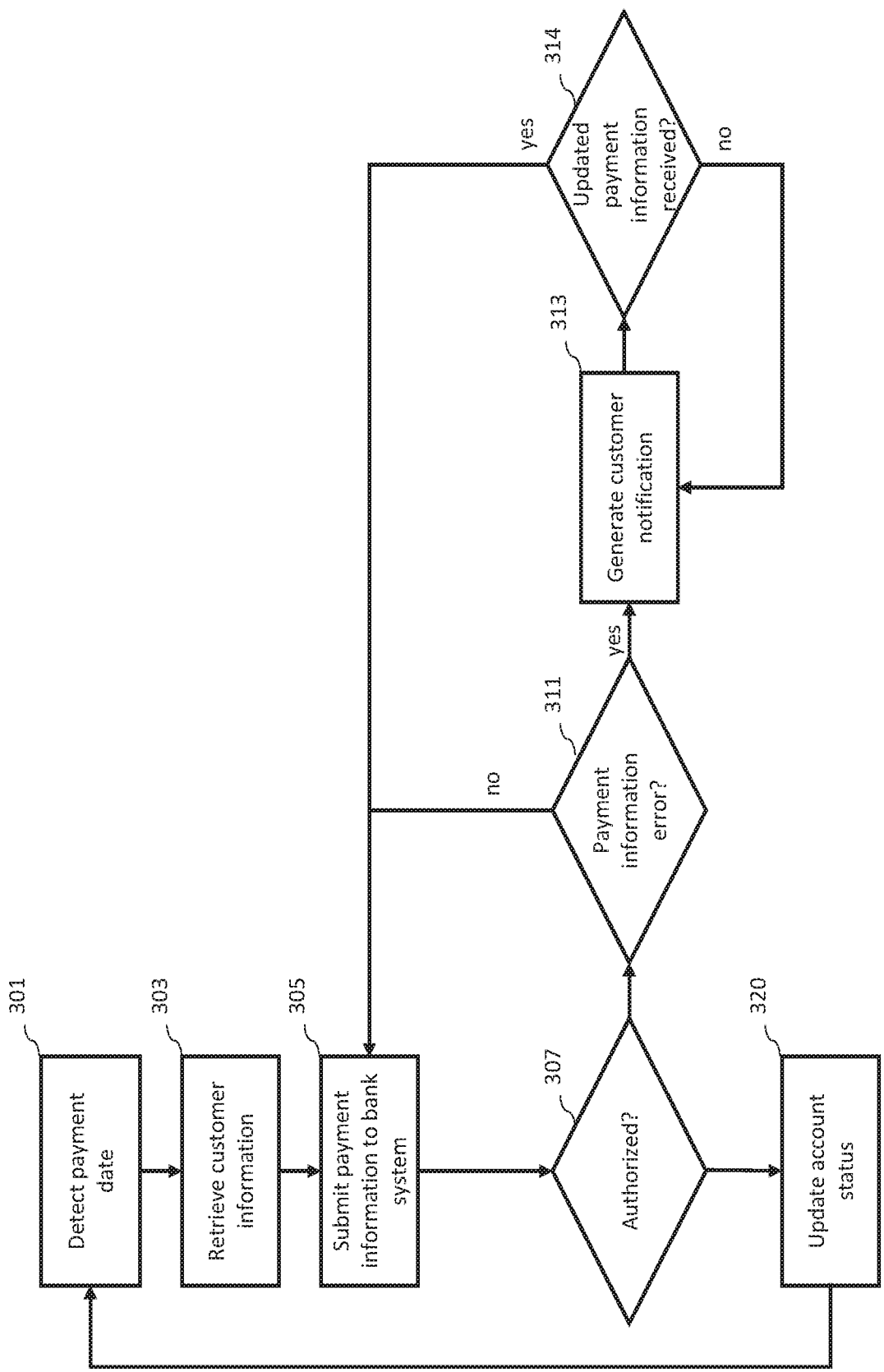
FIG. 3 comprises a flow diagram as configured in accordance with various embodiments of these teachings.

Referring next to FIG. 3, a method for processing recurring payments according to some embodiments is shown. The steps in FIG. 3 may generally be performed by a processor-based device such as an enterprise computer system, a central computer system, a server, a cloud-based server, an order management system, a personal computer, a user device, etc. In some embodiments, the steps in FIG. 3 may be performed by one or more of the central computer system 110, the payment system 120, and the messaging server 130 described with reference to FIG. 1 and/or the eStore server 223, the batch processor 230, the decision engine 232, the payment gateway 235, the email server 245, the communication hub 240, and the call center server 250 described with reference to FIG. 2 herein.

In some embodiments, prior to step 301, a customer enrolls in a recurring payment service or program. In setting up the recurring payment, the customer may configure a customer account comprising one or more of customer information, payment information, subscription terms, applicable discounts, etc. In some embodiments, the customer account may comprise a subscription and the recurring payment comprises a subscription fee for one or more of a club membership, a delivery service, a media subscription, a service subscription, and a product subscription. In some embodiments, the recurring payment may comprise one or more of an installment payment, a loan payment, and a bill payment.

In some embodiments, when a recurring payment is set up, the system may submit an initial payment authorization request to validate the provided payment information and/or collect the first payment. The system then stores the payment information provided by the customer for subsequent recurring payments. Recurring payments may then be processed with the steps shown in FIG. 3 periodically (e.g. weekly, monthly, quarterly, etc.) after the initial set up using the stored information.

In step 301, the system detects a payment date for a recurring payment associated with a customer account. In some embodiments, the payment date may be associated with the subscription renewal date or a billing due date. In some embodiments, the payment date may be the payment due date or be set a few days before the due date by the customer and/or the system. In some embodiments, the system may track the "next payment due" dates for a plurality of customer accounts in a recurring payment database and pull accounts with a payment due within a time frame (e.g. one day, 2 days, one weekend) to proceed with step 303.

In some embodiments, the system retrieves customer payment information for the customer account from the recurring payment database. In some embodiments, the customer payment information comprises information provided by a customer to set up the recurring payment. In some embodiments, the customer payment information comprises one or more of customer name, address, account number, credit card number, debit card number, expiration date, security code, phone number, and passcode. In some embodiments, recurring payment database may comprise the recurring payment database 115 described with reference to FIG. 1 and/or the eStore database 225 described with reference to FIG. 2.

In step 305, the system submits the customer payment information to a bank system. In some embodiments, customer payment information may be submitted via a payment system configured to aggregate and batch process charge requests. In some embodiments, the system may further from a plurality of payment processors based on the payment information (e.g. Visa, Master, or bank account). In some embodiments, the payment system may comprise one or more of the payment system 120 described with reference to FIG. 1, the batch processor 230, the decision engine 232, and the payment gateway 235 described with reference to FIG. 2, or other similar devices.

In step 307, the system determines whether the payment has been authorized. In some embodiments, a payment system may provide either an authorization confirmation and/or an error code based on the bank system's response or lack of response to the charge request. If an authorization confirmation is received, the system proceeds to step 320 and updates the customer's account status. For example, a subscription account's expiration date may be extended and/or the status may be set to "active" in response to the received payment. If the submitted payment request is not authorized, the system proceeds to step 311.

In step 311, the system uses the received error code to determine whether the errors is associated with a customer payment information error. In some embodiments, the payment system is configured to generate a reason/error code for each payment authorization request based on the payment system's communication with a bank system. The table below provides several examples of codes that can be generated by the payment system.

TABLE 1

Exemplary Error Codes

| Reason Code | Text | Reason | Block Checkout? |
|---|---|---|---|
| 0 | Authorized | The transaction is authorized | No |
| 10 | Declined | The transaction is declined May be because of insufficient funds, expired card, flat decline etc. | Yes |
| 12 | Referral | Refer the card issuer (Call the card issuer) | Yes |
| 14 | Pickup | Possible fraud or unauthorized use - Cashier, if possible has to retain the card. | Yes |
| 16 | AVS Check failed | Address verification failed | Yes |
| 18 | CVV Failed | The CVV was incorrect | Yes |
| 19 | XREF Service Error | The Xref service (Card reference -> Encrypted card number) service is not working | No |
| 20 | Authorizer Error | The authorizer returned with an Error RC | No |
| 91 | Network Timeout | The transaction timed out between the authorize and bank/issuer (Platform) | No |
| 99 | Epay Dismissal | 99.F2 - Timeouts - No response from authorizer | No |
|  | No | 99.F3 - Epay at Max capacity |  |
|  | No | 99.F4 - Transaction in progress - Either the reversal is sent when authorization is happening or a second authorization is sent too quick |  |
|  | No | 99.F5 - Reversal error - Reversal sent to different platform |  |
|  | No | 99.F6 - Auth links down - All links to authorizer from App is down |  |
|  | No | 99.F7 - Card type error - BIN Not found |  |

TABLE 1-continued

Exemplary Error Codes

| Reason Code | Text | Reason | Block Checkout? |
|---|---|---|---|
|  | No | 99.F8 - Epay not accepting work |  |
|  | No | 99.A - Cannot reverse due to original not found - The original transaction didn't happen in this Epay |  |
|  | No | 99.FB - Encryption/Decryption error - The encrypted card number couldn't be decrypted |  |

For example, if the payment gateway is not able to contact the bank system, the gateway may generate an error code associated with network issues (e.g. #91). If the error code is not associated with a payment information error, the system returns to 305 and attempts to resubmit the payment information for authorization automatically without notifying the customer. In some embodiments, the system may insert a wait time (e.g. 5 minutes, 1 hours, 1 day) between each resubmission attempts. In some embodiments, these failed requests may be added to the next batch of payment requests to be sent to payment processors. In some embodiments, the system may set a maximum number of retries (e.g. 5 retries). The maximum number of retries retires due to system error may be configurable by the system. Once the maximum number of retires due to system error is exceeded, the system may suspend the customer account and notify an employee and/or the customer.

If the error code is associated with customer payment information error (e.g. #16, #18), the system proceeds to step 313. In step 313, the system automatically generates a notification message for the customer at a messaging server. In some embodiments, the messaging server may generate a message using a message template and customer's information from the recurring payment database. In some embodiments, the notification message comprises a link to a website and/or a phone number to a customer service center for the customer to provide the updated customer payment information. In some embodiments, notification messages may comprise an email, a text message, a voice message (e.g. "robocall), a mobile messaging application message (e.g. Google chat, Facebook messenger, etc.), and the like. In some embodiments, the customer account and/or subscription may be associated with a mobile application (e.g. mobile ordering application, media play application, etc.) and the notification message may comprise a pop-up notification and/or in-app notification. In some embodiments, the notification message may be generated and sent to customers with one or more of the messaging server 130 described with reference to FIG. 1, the communication hub 240 and the email server 245 described with reference to FIG. 2, or other similar devices.

In step 314, the system determines whether the customer has provided updated payment information. In response to receiving the notification message in step 313, a customer may provide updated payment information via a website and/or by contacting a customer service agent. In some embodiments, the updated payment information may comprise a new form of payment (e.g. new credit card, different bank account, etc.). In some embodiments, the updated payment information may comprise modifications to the original payment information (e.g. new expiration date, new address, etc.). In some embodiments, when an updated payment information is received, the system may immediately return to step 305 and try to obtain payment authorization with the updated payment information. In some embodiments, the updated payment information may be added to the next patch of payment requests to be processed. In some embodiments, if the authorization also fails with the updated customer payment information, the system is further configured to automatically generate a second notification message to the customer at the messaging server by repeating steps 311 and 313.

If no updated information is received in step 314, after a set period of time (e.g. 1 day, 48 hours, etc.) the process may return to step 313 and another notification message may be generated. In some embodiments, the system may periodically send the notification message to the customer until a payment is authorized and/or for a set period time. For example, the system may allow a 5 day grace period for the customer to update their payment information and send a notification each day during the grace period. In some embodiments, the number of notification and/or the length of the grace period may comprise customer and/or system configurable variables. For example, a customer may select how many notifications he/she wishes to receive before their subscription is canceled. In another example, the system may give different customers different lengths of grace period based on the customer's payment history, purchase history, account type, etc. In some embodiments, one or more of terms, benefits, and award accrual of the subscription may be reinstated after the payment authorization is received and/or maintained for a set period time after sending the notification message. For example, a customer may be subscribed to a delivery service at a promotional rate. If the system is unable to authorize their third recurring payment to renew the delivery service subscription, the system may suspend the benefits of the subscription and send the customer a notification stating that they have five days to provide updated payment information before their subscription is canceled. If updated payment information is received and authorized within five days of the subscription expiration date, the system may fully reinstate the terms and promotional rate of the original subscription.

In some embodiments, the steps in FIG. 3 may be performed on each payment date for each customer account set up for recurring payment. For each authorized payment, the system updates the customer account status and/or status in step 320. The process may repeat for the same account at the next payment date. In some embodiments, payment requests may be processed, resubmitted, and/or sent to the messaging server in a batch. For example, the system may aggregate all recurring payments for the day and submit them at night to a bank system. Requests rejected for system errors may be aggregated and resubmitted at a later time (e.g. 1 hour later, 3 hours later, etc.). Requests rejected for payment information errors may be aggregated at the messaging server and notifications may be generated and sent out to customers together at a set time (e.g. 8 am, noon, etc.).

Figure 4:
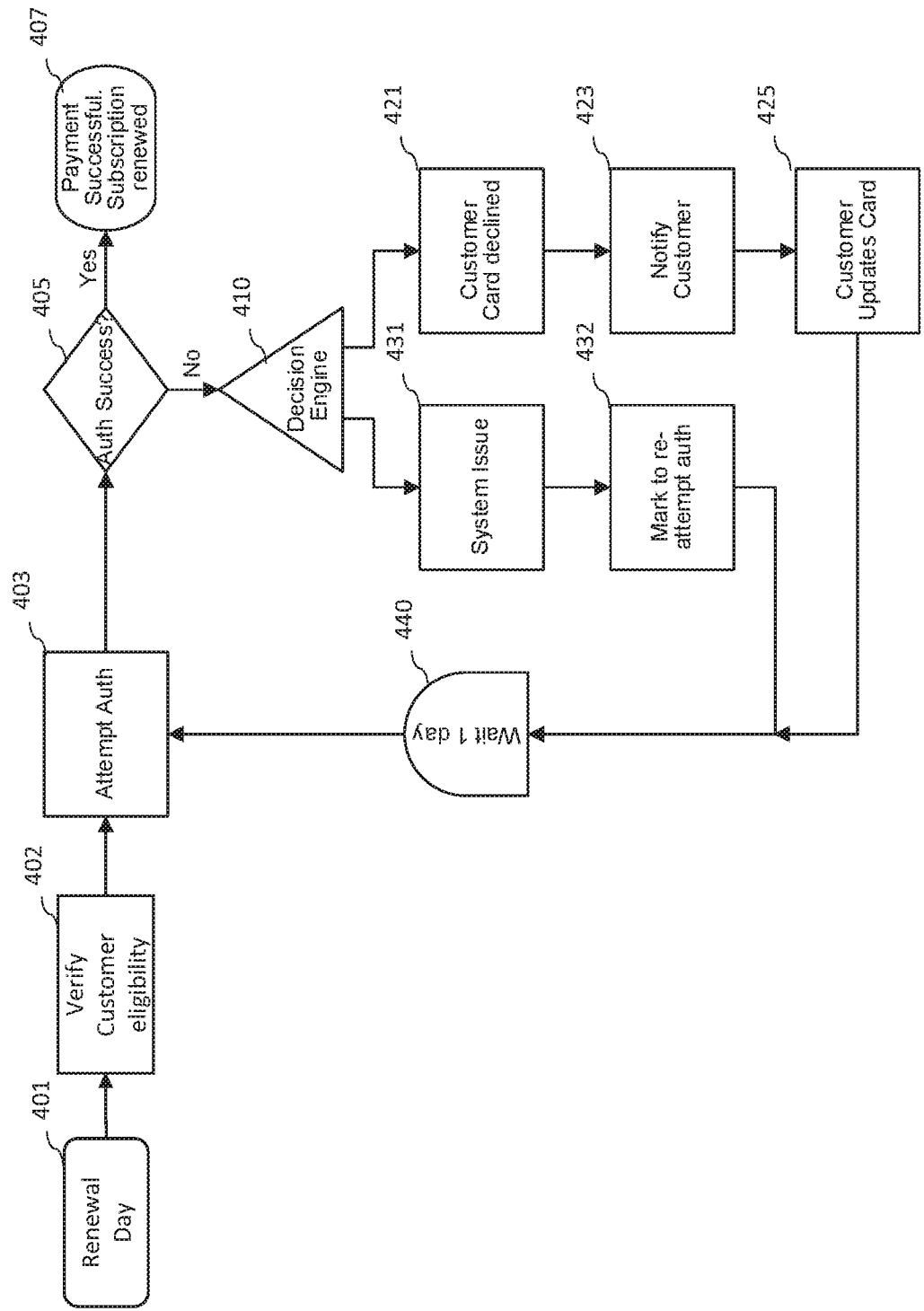
FIG. 4 comprises a flow diagram as configured in accordance with various embodiments of these teachings.

Referring next to FIG. 4, a process for processing recurring payments according to some embodiments is shown. The steps in FIG. 4 may generally be performed by a processor-based device such as an enterprise computer system, a central computer system, a server, a cloud-based server, an order management system, a personal computer, a user device, etc. In some embodiments, the steps in FIG. 4 may be performed by one or more of the central computer system 110, the payment system 120, and the messaging server 130 described with reference to FIG. 1 and/or the eStore server 223, the batch processor 230, the decision engine 232, the payment gateway 235, the email server 245, the communication hub 240, and the call center server 250 described with reference to FIG. 2 herein.

In step 401, the process is triggered on the renewal day of a subscription plan. In step 402, the system verifies the customer account's eligibility for recurring payment. Account eligibility may be determined based on one or more of account type, subscription type, customer account settings (e.g. autopay enabled/disabled), and system imposed renewal restrictions. If the account is eligible of renewal, in step 403, the system attempts to authorize payment with the payment information previously provided by the customer. In step 405, if the authorization request is successful, the process proceeds to step 407 and the subscription is renewed. If the authorization request is not successful, in step 410, a decision engine determines how to handle the authorization error. If the error is a system issue in step 431, the system marks the account to reattempt authorization in step 432. The system then waits for a set period of time (e.g. 1 day) in step 400 and again attempts authorization in step 403. If authorization failure is due to the customer card being declined in step 421, in step 423, the system notifies the customer. In step 425, the customer updates the card information. The system then proceeds to step 440 with a waiting period and then attempts to authorize payment again in step 403 with the updated card information.

Figure 5A:
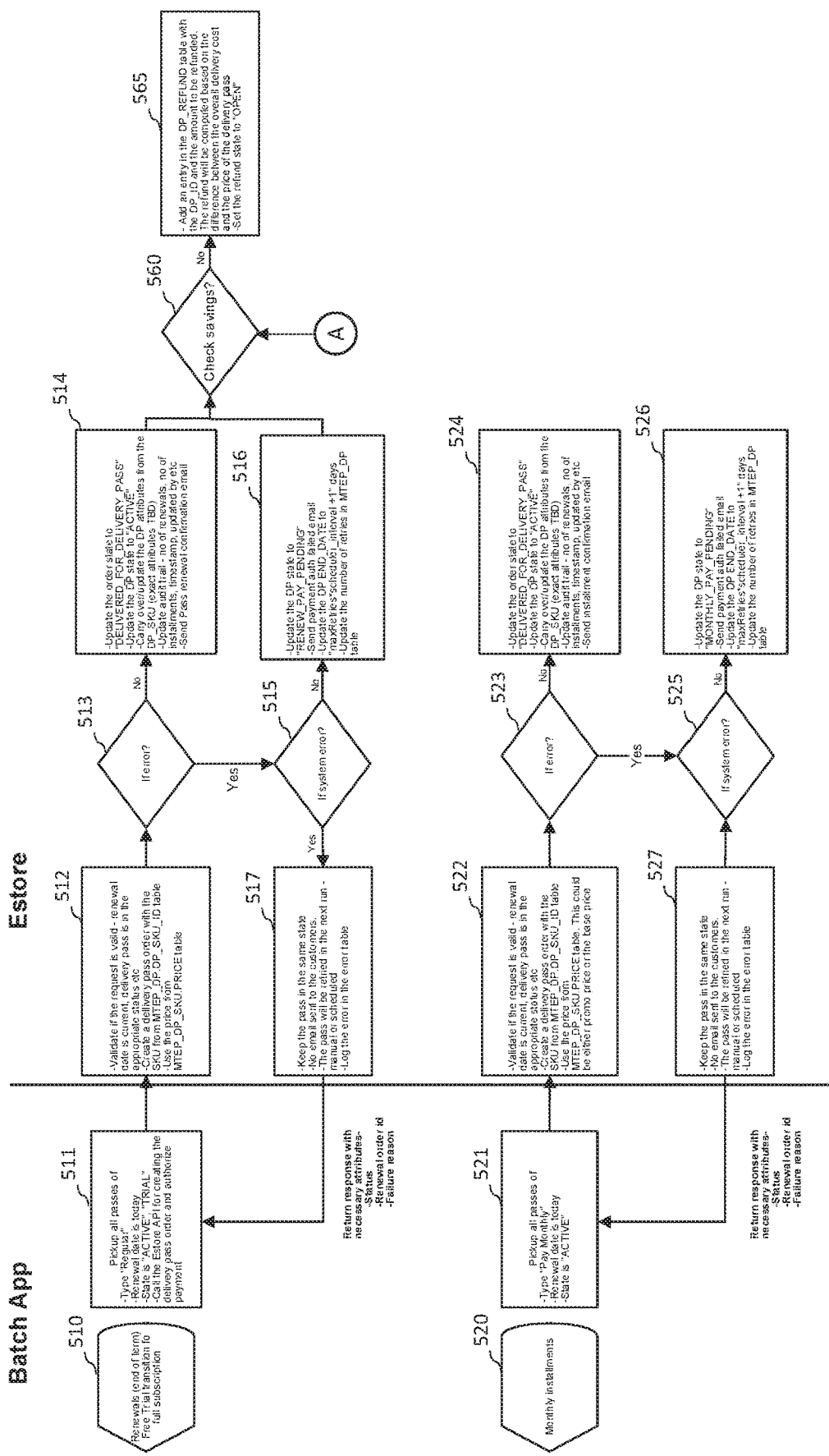
FIGS. 5A (with partial views FIG. 5A-1, FIG. 5A-2, and FIG. 5A-3) and 5B (with partial views FIG. 5B-1, FIG. 5B-2, and FIG. 5B-3) comprise a flow diagram as configured in accordance with various embodiments of these teachings.
Figure 5A:
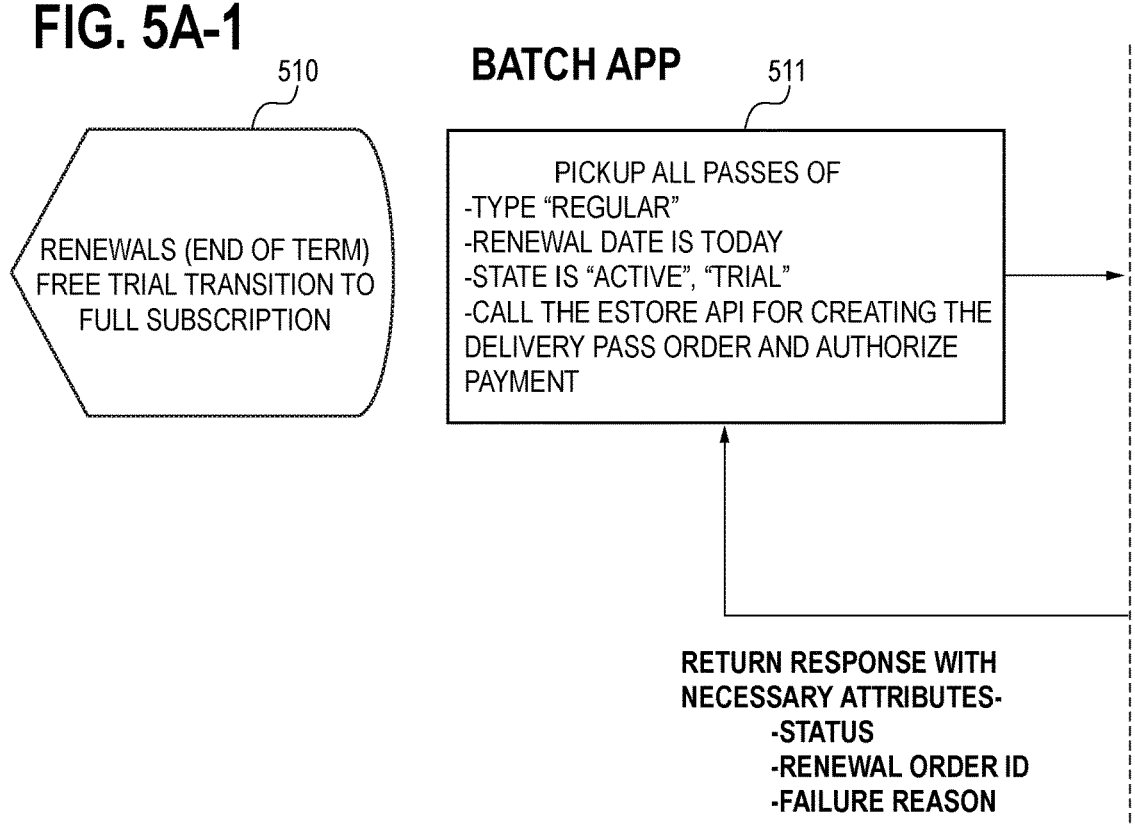
Figure 1:
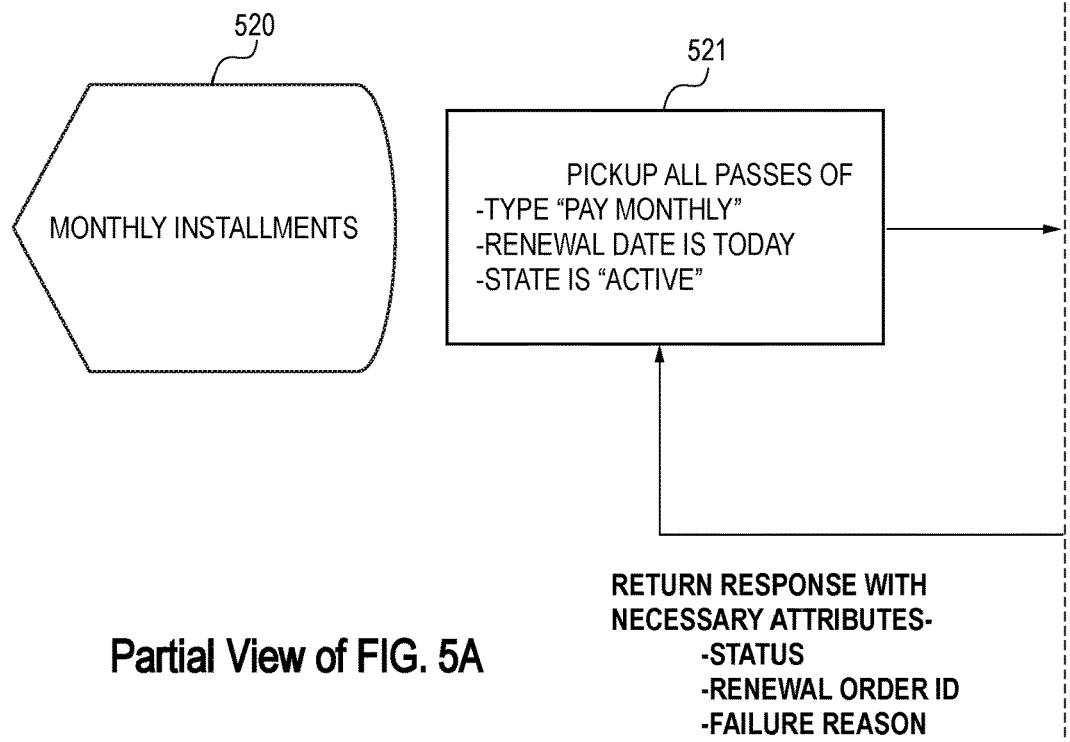
Figure 5B:
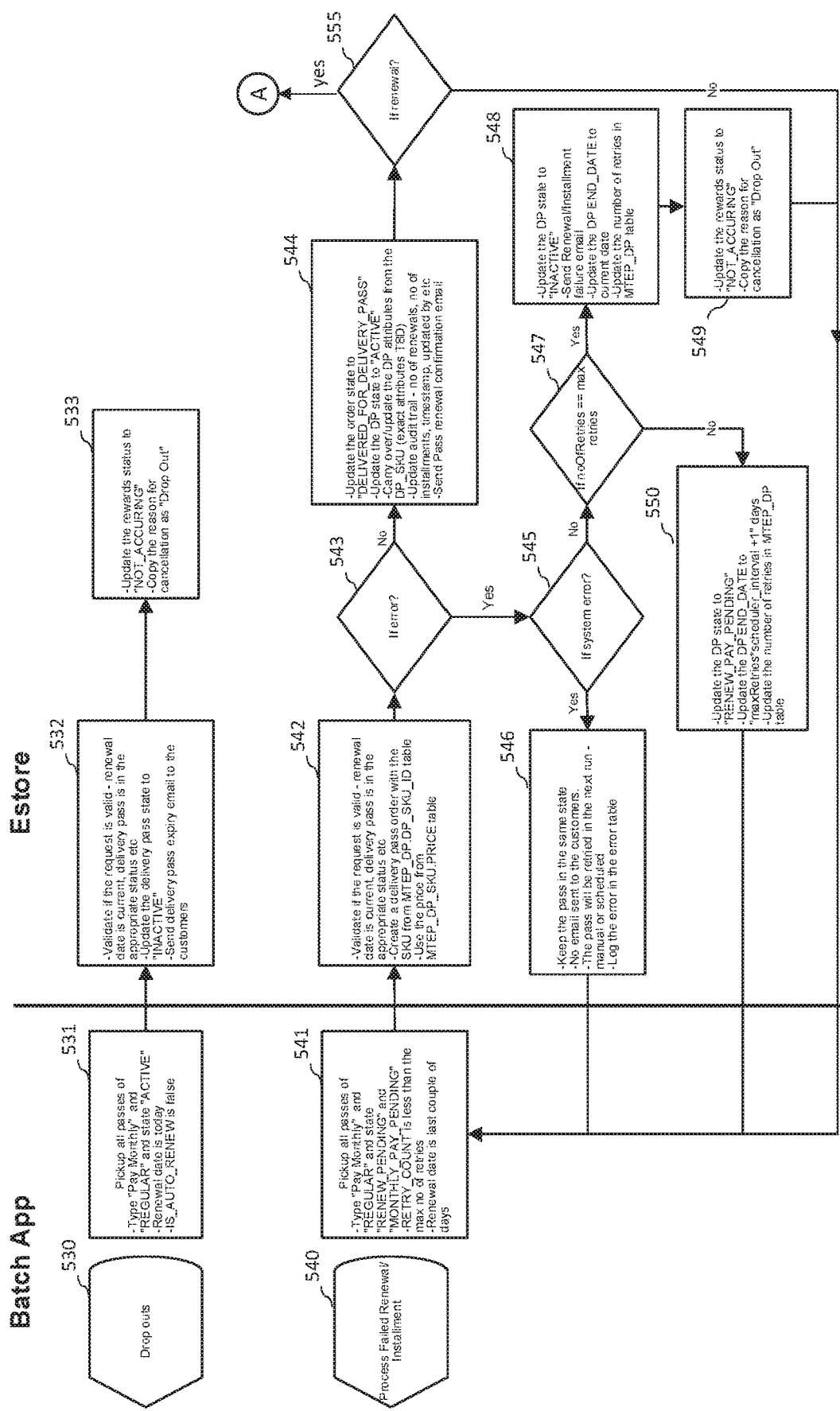
Figures 1, 5B:
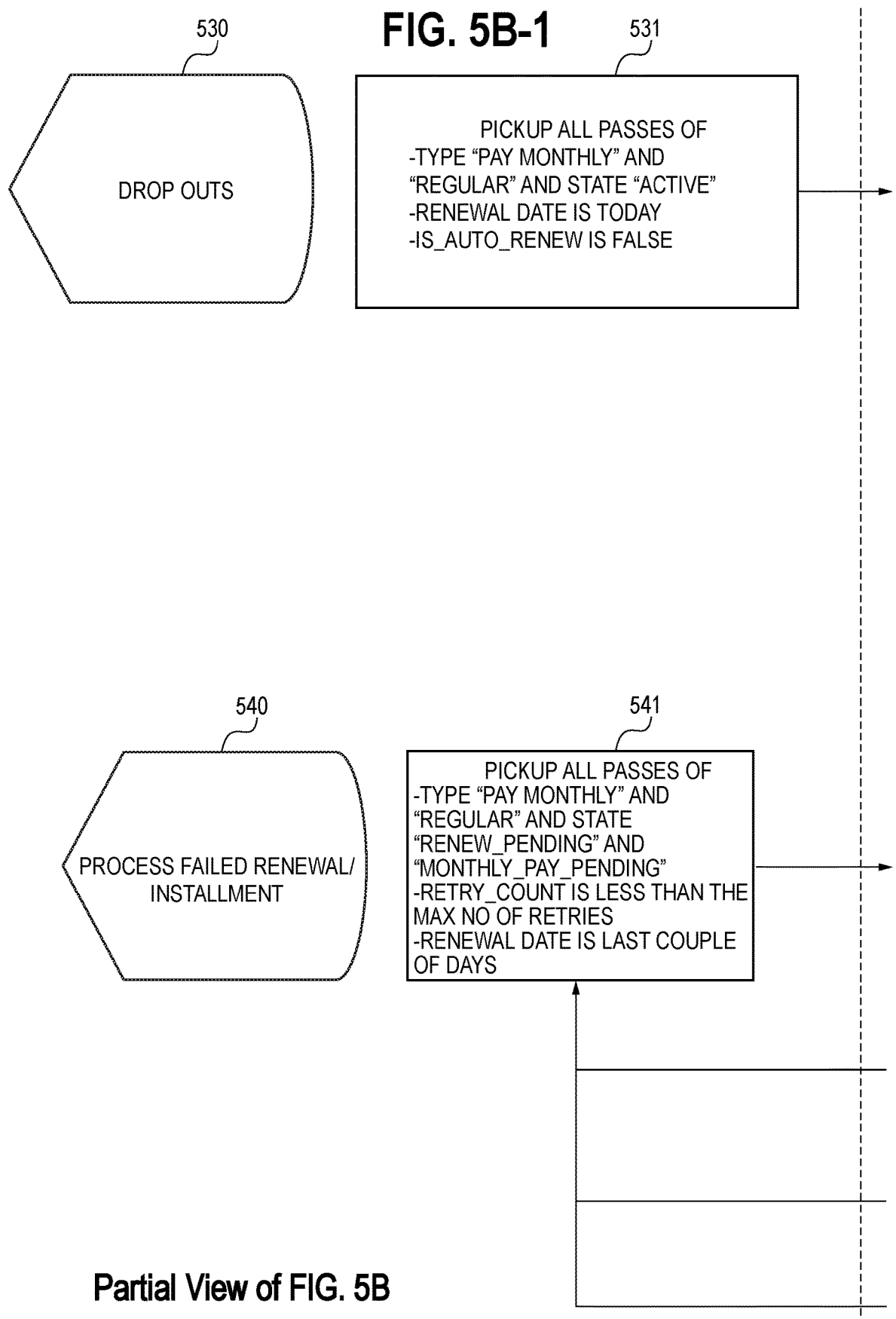
Figures 2, 5B:
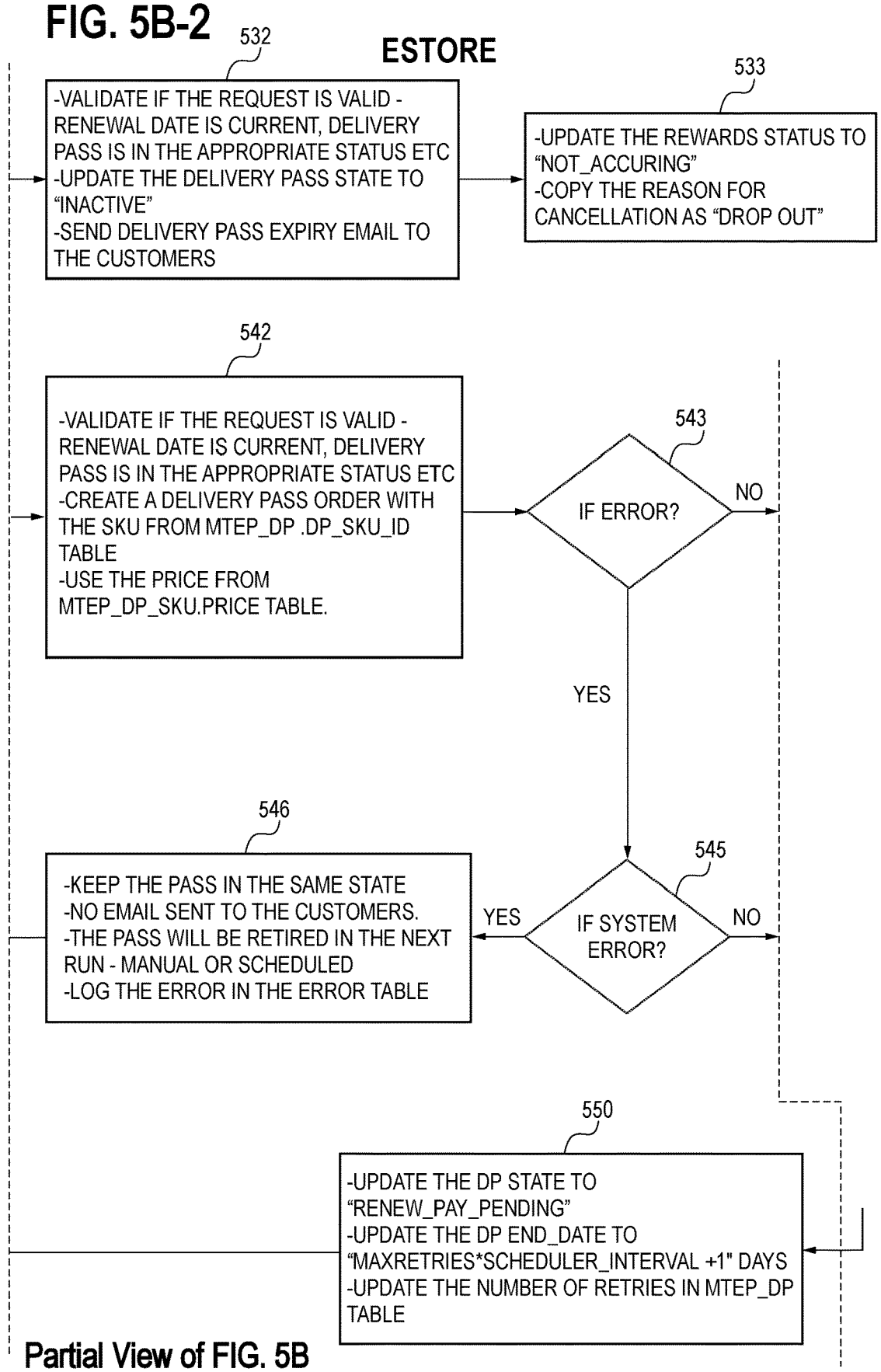

Referring next to FIGS. 5A and 5B, a method for handling payment processing for a delivery pass subscription according to some embodiments is shown. The steps in FIGS. 5A and 5B may generally be performed by a processor-based device such as an enterprise computer system, a central computer system, a server, a cloud-based server, an order management system, a personal computer, a user device, etc. In some embodiments, the steps in FIGS. 5A and 5B may be performed by one or more of the central computer system 110, the payment system 120, and the messaging server 130 described with reference to FIG. 1 and/or the eStore server 223, the batch processor 230, the decision engine 232, the payment gateway 235, the email server 245, the communication hub 240, and the call center server 250 described with reference to FIG. 2 herein.

In FIGS. 5A and 5B, a "delivery pass" refers to a subscription to a delivery service that provides customers with free or discounted delivery cost for products ordered from a seller. In the first scenario 510, the batch application processes renewal payments and/or customers transitioning from free trails to full subscriptions. In step 511, the batch processor picks up all regular type customer accounts with a renewal date that is the current date, the status of "active" or "trial," and with which the customer has used the eStore API to create an order and authorized payment. In step 512, the eStore system validates the request by verifying that the renewal date is current, the subscription account is in the appropriate state, etc. The system also creates a delivery pass order with a stock keeping unit (SKU), delivery pass data (e.g. MTEP_DP DO_SKU_ID table), and uses the prices from a price lookup table (e.g. MTEP_DP SKU.PRICE table). If no error is detected in step 513, the system proceeds to step 514. In step 514, the system updates the order state to reflect the customer's subscription to the delivery pass program (e.g. "DELIVERED_FOR_DELIVERY_PASS"), updates the delivery pass state to "active," carry over/update the delivery pass attributes, and sends a pass renewal confirmation email. In some embodiments, the system further updates the audit trail to reflect the number of renewals, the number of installments, timestamp, updated by, etc. The system also sends out a pass renewal confirmation email to the customer.

If an error is detected in step 513, the process proceeds to step 515 and the system determines whether there is a system error. If a system error causes the validation in step 512 to fail, in step 517, the system keeps the pass in the same state, does not send a notification to the customer, and logs the error. The subscription account is then retried in the next manual or scheduled run. The process then returns to step 511 with a return response comprising the status of the account, renewal order ID, and the failure reason.

If the error is not a system error in step 515, in step 516, the system updates the delivery pass state to payment pending (e.g. "RENEW_PAY_PENDING), sends a payment authorization failed email to the customer, updates the delivery pass end date to the maximum retry days plus one day, and updates the number of retries in a table (e.g. "MTEP_DP"). In some embodiments, maximum retries (e.g. "maxRetries") may comprise a variable configurable by the system and/or the customer.

After steps 514 and 516, the system checks for savings in step 560. If savings is achieved, the process completes. If no savings is achieved, in step 565, the system adds an entry to a refund table (e.g. "DP_REFUND") with the identifier of the delivery pass (e.g. "DP_ID") and the amount to be refunded. The refund may be computed based on the difference between the overall delivery cost and the price of the delivery pass. The system further sets the refund state to "open" in step 565.

In the second scenario 520, the system processes payments for monthly installment payments. In step 521, the system picks up all passes with the type of "pay monthly," has a renewal date that is the current date, and has the state of "active." In step 521, the batch processor picks up all regular type customer accounts with a renewal date that is the current date, the status of "active" or "trial," and with which the customer has used the eStore API to create an order and authorized payment. In step 522, the eStore system validates the request by verifying that the renewal date is current, the subscription account is in the appropriate state, etc. The system also creates a delivery pass order with a stock keeping unit (SKU), delivery pass data (e.g. MTEP_DP DO_SKU_ID table), and uses the prices from a price lookup table (e.g. MTEP_DP_SKU.PRICE table). The price may comprise promotional or base price. If no error is detected in step 523, the system proceeds to step 524. In step 524, the system updates the order state to reflect the customer's subscription to the delivery pass program (e.g. "DELIVERED_FOR_DELIVERY_PASS"), updates the delivery pass state to "active," carry over/update the delivery pass attributes, and sends a pass renewal confirmation email. In some embodiments, the system further updates the audit trail to reflect the number of renewals, the number of installments, timestamp, updated by, etc. The system also sends out a pass renewal confirmation email.

If an error is detected in step 523, the process proceeds to step 525 and the system determines whether there is a system error. If a system error causes the validation in step 522 to fail, in step 527, the system keeps the pass in the same state, does not send a notification to the customer, and logs the error. The subscription account is then retried in the next manual or scheduled run. The process then returns to step 521 with a return response comprising the status of the account, renewal order ID, and the failure reason.

If the error is not a system error in step 525, in step 526, the system updates the delivery pass state to payment pending (e.g. "RENEW_PAY_PENDING), send a payment authorization failed email to the customer, updates the delivery pass end date to the maximum retry days plus one day, and updates the number of retries in a table (e.g. "MTEP_DP"). In some embodiments, maximum retries (e.g. "maxRetries") may comprise a variable configurable by the system and/or the customer.

In the third scenario 530, the batch application processes dropouts. In step 531, the batch processor picks up all customer accounts on a "pay monthly" plan, have the status of "regular" and "active," and has auto renewal turned off (e.g. "IS_AUTO_RENEW"=false). In step 532, the eStore system validates the request by verifying that the renewal date is current, the delivery pass is in the appropriate state, etc. The system then updates the delivery pass state to "inactive" and send a delivery pass expiry email to the customers. In step 533, the system further turns off reward earning on the account (e.g. reward status="NOT_ACCURING) and copy the reason for cancellation as "drop out."

In the fourth scenario 540, the batch application processes renewal and installment payments with processing failure. In step 541, the system picks up all pass accounts with the type "pay monthly" and "regular," states of "renewal pending" and "monthly payment pending," a retry count under the maximum retry limit, and a recent (e.g. last 5 days) renewal date.

In step 542, the eStore system validates the request by verifying that the renewal date is current, the subscription account is in the appropriate state, etc. The system also creates a delivery pass order with a stock keeping unit (SKU), delivery pass data (e.g. MTEP_DP DO_SKU_ID table), and uses the prices from a price lookup table (e.g. MTEP_DP_SKU.PRICE table). If no error is detected in step 543, the system proceeds to step 544. In step 544, the system updates the order state to reflect that customer's subscription to the delivery pass program (e.g. "DELIVERED_FOR_DELIVERY_PASS"), updates the delivery pass state to "active," carry over/update the delivery pass attributes, and sends a pass renewal confirmation email. In some embodiments, the system further updates the audit trail to reflect the number of renewals, the number of installments, timestamp, updated by, etc. The system also sends out a pass renewal confirmation email to the customer.

After step 555 the system determines whether the charge was for a renewal of the delivery pass subscription. If the charge is for a renewal fee payment, the system proceeds to step 560 and check for savings. Otherwise, the process returns back to step 541.

If an error is detected in step 543, the process proceeds to step 545 and the system determines whether there is a system error. If a system error causes the validation in step 542 to fail, in step 546, the system keeps the pass in the same state, does not send a notification to the customer, and logs the error. The payment authorization is then retried in the next manual or scheduled run. The process then returns to step 541.

If the error is not a system error in step 545, in step 547, the system determines whether the number of retries for the payment has reached the maximum number of retries. In some embodiments, the maximum retries variable may be configurable by the system and/or the customer. If the maximum retries number has not been exceeded, the system proceeds to step 550. In step 550, the system updates the delivery pass state to payment pending (e.g. "RENEW_PAY_PENDING"), update the delivery pass end date to the maximum retry days plus one day, and update the number of retries in a table (e.g. "MTEP_DP").

If the numbers of retries has exceeded the maximum, in step 548 the system updates the delivery pass state to "inactive," sends a renewal/installment failure email to the customers, updates the end date of the delivery pass subscription to the current date, and updates the number of retries in a table (e.g. "MTEP_DP" table). In step 549, the system further turns off reward earning on the account (e.g. reward status="NOT_ACCURING) and copy the reason for cancellation as "drop out."

For subscription services, payments are typically processed on the day of the renewal. If the authorization fails, the customer can lose their subscription and any associated promotion. This leads to increased call volume for the call center as customers call to get the subscription reinstated. With the systems and processes described herein, instead of the paying process starting five days prior to the order date, the system may start the process on the renewal date and run it for 5 days after the renewal date. If the payment fails on the day of the renewal, the system notifies the customers that their payment has failed and they have 5 days to update the card before the subscription is canceled. This allows customers to keep the subscription without interruptions and allows the customer to update the card on the site without using a call center customer service agent.

In some embodiments, the system may look at the user eligibility at the time of renewal. The system also provides customization for: how many times the system retries after a system failure, how many times and how long the system retries after a user card failure, and how long the subscription continues uninterrupted after the first failure detection. The system may be configured to keep the subscription in a temporary "past_due" state while waiting for customers to provide updated information which allows the system to follow up with the customer for payments.

In some embodiments, how many times the system retries authorization after a system failure may comprise a system configurable variable. In some embodiments, how many times and how long the system retries authorization after a user card failure may comprise system and/or customer configurable variables. In some embodiments, how long the subscription continues uninterrupted after the first failure detection may comprise a system or customer configurable variable.

In some embodiments, a system for automated customer recurring payment processing comprises a recurring payment database storing payment information for a plurality of customers, a payment system coupled to one or more bank systems, a messaging server configured to generate and send messages to customers, and a central computer system coupled to the recurring payment database, the payment system, and the messaging server. The central computer system being configured to: detect a payment date for a recurring payment associated with a customer account, retrieve customer payment information for the customer account from the recurring payment database, the customer payment information comprises information provided by a customer to set up the recurring payment, submit the customer payment information to a bank system for authorization via the payment system, in the event the authorization fails and an error code determined based on a communication between the payment system and the bank system corresponds to a payment information error: automatically generate a notification message to the customer at the messaging server, receive updated customer payment information in response to the notification message, submit the updated customer payment information to the bank system via the payment system; and update an account status of the customer account when a payment authorization is received from the bank system.

In one embodiment, a method for automated customer recurring payment processing comprises detecting, at a control circuit, a payment date for a recurring payment associated with a customer account, from a recurring payment database storing payment information for a plurality of customers, retrieving customer payment information for the customer account from the recurring payment database, the customer payment information comprises information provided by a customer to set up the recurring payment, submitting the customer payment information to a bank system for authorization via a payment system coupled to one or more bank systems, in the event the authorization fails and an error code determined based on a communication between the payment system and the bank system corresponds to a payment information error: automatically generating a notification message to the customer at a messaging server, receiving updated customer payment information in response to the notification message configured to generate and send messages to customers, submitting the updated customer payment information to the bank system via the payment system, and updating an account status of the customer account when a payment authorization is received from the bank system.

In some embodiments, a system for automated customer recurring payment processing comprises a recurring payment database storing payment information for a plurality of customers, a payment system coupled to one or more bank systems, a messaging server configured to generate and send messages to customers, and a central computer system coupled to the recurring payment database, the payment system, and the messaging server. The central computer system being configured to: detect a payment date for a recurring payment associated with a customer account, retrieve customer payment information for the customer account from the recurring payment database, the customer payment information comprises information provided by a customer to set up the recurring payment, submit the customer payment information to a bank system for authorization via the payment system, receive an reason code from the payment system determined based on a communication between the payment system and the bank system, in the event that the reason code indicates a payment information error: automatically generate a notification message to the customer at the messaging server to request for updated customer payment information, and periodically re-send the notification message until the updated payment information is received and/or for a set period of time, in the event that the reason code indicates a system error: automatically resubmit the customer payment information to the bank system, and in the event that the reason code indicates a successful authorization: update an account status of the customer account.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system for automated customer recurring payment processing comprising:
   a recurring payment database storing payment information for a plurality of customers;
   a payment system coupled to one or more bank systems, the payment system being configured to output an error code indicating a system error when the payment system is not able to establish data connection with the one or more bank systems over a network;

a messaging server configured to generate and send messages to customer devices; and a central computer system coupled to the recurring payment database, the payment system, and the messaging server, the central computer system being configured to:
    detect a payment date for a recurring payment associated with a customer account;
    retrieve customer payment information for the customer account from the recurring payment database, the customer payment information comprises information provided by a customer to set up the recurring payment;
    submit the customer payment information to a bank system for authorization via the payment system;
    receive the error code from the payment system in response to the submission of customer payment information;
    in the event that the error code corresponds to the system error:
        resubmit the customer payment information to the bank system for authorization via the payment system after a predetermined wait time; and
    in the event that the error code corresponds to a payment information error and not system error:
        automatically generate a notification message to the customer at the messaging server;
        receive updated customer payment information in response to the notification message after the payment date, wherein the updated customer payment information comprises one or more of customer name, address, account number, credit card number, debit card number, expiration date, security code, or phone number;
        submit the updated customer payment information to the bank system via the payment system; and
        update an account status of the customer account when a payment authorization is received from the bank system.

2. The system of claim 1, wherein the customer account comprises a subscription, and the recurring payment comprises a subscription fee, an installment payment, and/or a bill payment for one or more of a club membership, a delivery service, a media subscription, a service subscription, or a product subscription.

3. The system of claim 2, wherein one or more of terms and benefits of the subscription is reinstated after the payment authorization is received after the notification message.

4. The system of claim 1, wherein the central computer system is further configured to:
    periodically send the notification message to the customer for a set period of time until a payment is authorized, wherein the set period of time is configurable by the customer and/or the system.

5. The system of claim 1, wherein the central computer system is further configured to:
    periodically resubmit the payment information for authorization until a payment is authorized, wherein a maximum number of authorization retries is configurable by the customer and/or the system.

6. The system of claim 1, wherein in the event that the authorization also fails with the updated customer payment information, the central computer system is further configured to:
    automatically generate a second notification message to the customer at the messaging server.

7. The system of claim 1, wherein the notification message comprises a link to a website and/or a phone number to a customer service center for the customer to provide the updated customer payment information.

8. A method for automated customer recurring payment processing comprising:
    detecting, at a control circuit, a payment date for a recurring payment associated with a customer account, from a recurring payment database storing payment information for a plurality of customers;
    retrieving customer payment information for the customer account from the recurring payment database, the customer payment information comprises information provided by a customer to set up the recurring payment;
    submitting the customer payment information to a bank system for authorization via a payment system coupled to one or more bank systems, the payment system being configured to output an error code indicating system failure when the payment system is not able to establish data connection with the one or more bank systems over a network;
    generating the error code at the payment system;
    in the event that the error code corresponds to a system error:
        resubmit the customer payment information to the bank system for authorization via the payment system after a predetermined wait time; and
    in the event that the error code corresponds to a payment information error and not the system error:
        automatically generating a notification message to a customer device associated with the customer at a messaging server;
        receiving updated customer payment information in response to the notification message after the payment date, wherein the updated customer payment information comprises one or more of customer name, address, account number, credit card number, debit card number, expiration date, security code, or phone number;
        submitting the updated customer payment information to the bank system via the payment system; and
        updating an account status of the customer account when a payment authorization is received from the bank system.

9. The method of claim 8, wherein the customer account comprises a subscription, and the recurring payment comprises a subscription fee, an installment payment, and/or a bill payment for one or more of a club membership, a delivery service, a media subscription, a service subscription, or a product subscription.

10. The method of claim 9, wherein one or more of terms and benefits of the subscription is reinstated after the payment authorization is received after the notification message.

11. The method of claim 8, further comprising:
    periodically sending the notification message to the customer for a set period of time until a payment is authorized, wherein the set period of time is configurable by the customer and/or the system.

12. The method of claim 8, further comprising:
    periodically resubmitting the payment information for authorization until a payment is authorized, wherein a maximum number of authorization retries is configurable by the customer and/or the system.

13. The method of claim 8, further comprising:
in the event that the authorization also fails with the updated customer payment information, automatically generate a second notification message to the customer at the messaging server.

14. The method of claim 8, wherein the notification message comprises a link to a website and/or a phone number to a customer service center for the customer to provide the updated customer payment information.

15. A system for automated customer recurring payment processing comprising:
- a recurring payment database storing payment information for a plurality of customers;
- a payment system coupled to one or more bank systems, the payment system being configured to output an error code indicating system failure when the payment system is not able to establish data connection with the one or more bank systems over a network;
- a messaging server configured to generate and send messages to customers; and
- a central computer system coupled to the recurring payment database, the payment system, and the messaging server, the central computer system being configured to:
  - detect a payment date for a recurring payment associated with a customer account;
  - retrieve customer payment information for the customer account from the recurring payment database, the customer payment information comprises information provided by a customer to set up the recurring payment;
  - submit the customer payment information to a bank system for authorization via the payment system;
  - receive the error code from the payment system in response to the submission of customer payment information;
  - in the event that the error code indicates a payment information error and not a system error:
    - automatically generate a notification message to a customer device associated the customer at the messaging server to request for updated customer payment information wherein the updated customer payment information comprises one or more of customer name, address, account number, credit card number, debit card number, expiration date, security code, or phone number; and
    - periodically re-send the notification message until the updated payment information is received and/or for a set period of time;
  - in the event that the error code indicates the system error:
    - automatically resubmit the customer payment information to the bank system via the payment system after a predetermined wait time; and
  - in the event that the error code indicates a successful authorization:
    - update an account status of the customer account.

* * * * *